US009544491B2

(12) United States Patent
Pryszo et al.

(10) Patent No.: US 9,544,491 B2
(45) Date of Patent: Jan. 10, 2017

(54) MARITIME CAMERA AND CONTROL SYSTEM

(71) Applicant: Furuno Electric Co., Ltd., Nishinomiya (JP)

(72) Inventors: Brice Pryszo, Bidart (FR); Iker Pryszo, Beaverton, OR (US); Mathieu Jacquinot, Bidart (FR)

(73) Assignee: Furuno Electric Co., Ltd., Nishinomiya (JP)

( * ) Notice: Subject to any disclaimer, the term of this patent is extended or adjusted under 35 U.S.C. 154(b) by 63 days.

(21) Appl. No.: 14/307,435

(22) Filed: Jun. 17, 2014

(65) Prior Publication Data
US 2015/0365581 A1 Dec. 17, 2015

(51) Int. Cl.
*H04N 5/232* (2006.01)
*H04N 7/18* (2006.01)
*G06T 19/00* (2011.01)

(52) U.S. Cl.
CPC ......... *H04N 5/23203* (2013.01); *G06T 19/006* (2013.01); *H04N 5/23296* (2013.01); *H04N 7/183* (2013.01); *H04N 7/185* (2013.01)

(58) Field of Classification Search
CPC ............ H04N 5/23293; H04N 5/23216; H04N 5/23296; H04N 5/23203; H04N 7/183; H04N 7/185; G06T 19/006; G01S 7/22; G01S 13/9307; G01S 13/867
See application file for complete search history.

(56) References Cited

U.S. PATENT DOCUMENTS

| | | | |
|---|---|---|---|
| 5,790,183 A | 8/1998 | Kerbyson | |
| 7,511,736 B2 * | 3/2009 | Benton | G01C 21/20 348/113 |
| 8,215,252 B1 * | 7/2012 | Chun | B63B 39/005 114/121 |
| 8,265,866 B2 * | 9/2012 | Altamura | G01C 21/20 701/409 |

(Continued)

FOREIGN PATENT DOCUMENTS

| | | |
|---|---|---|
| DE | 19754582 A1 | 6/1999 |
| EP | 1279081 B1 | 1/2012 |

(Continued)

OTHER PUBLICATIONS

European Patent Office, Extended European Search Report Issued in Application No. 15166551.0, Nov. 4, 2015, 3 pages.

*Primary Examiner* — Roberto Velez
*Assistant Examiner* — Tuan Le
(74) *Attorney, Agent, or Firm* — Alleman Hall McCoy Russell & Tuttle LLP

(57) ABSTRACT

A display device for controlling a remotely controlled camera is disclosed. The display device comprising an image receiver configured to receive an image of the image stream from the camera, and a processor. The processor including a retriever configured to retrieve a selected buffered image corresponding to a data insufficiency region within a target field of view while adjusting the camera from a current field of view to the target field of view until the image stream from the camera includes the insufficiency region being depicted within the target field of view and a depicter configured to depict the selected buffered image on the display device at least in the insufficiency region.

19 Claims, 9 Drawing Sheets

(56) References Cited

U.S. PATENT DOCUMENTS

| | | | |
|---|---|---|---|
| 8,762,041 B2 * | 6/2014 | Lindner | G01C 21/3632 701/425 |
| 2008/0310707 A1 * | 12/2008 | Kansal | G06T 19/006 382/154 |
| 2011/0310219 A1 | 12/2011 | Kim et al. | |
| 2014/0132725 A1 * | 5/2014 | Hsieh | H04N 13/004 348/46 |
| 2015/0022674 A1 * | 1/2015 | Blair | H04N 5/23222 348/207.1 |

FOREIGN PATENT DOCUMENTS

| | | | |
|---|---|---|---|
| JP | 2001086451 A | 3/2001 |
| WO | 3847117 A1 | 10/1998 |
| WO | 2013129188 A1 | 9/2013 |

\* cited by examiner

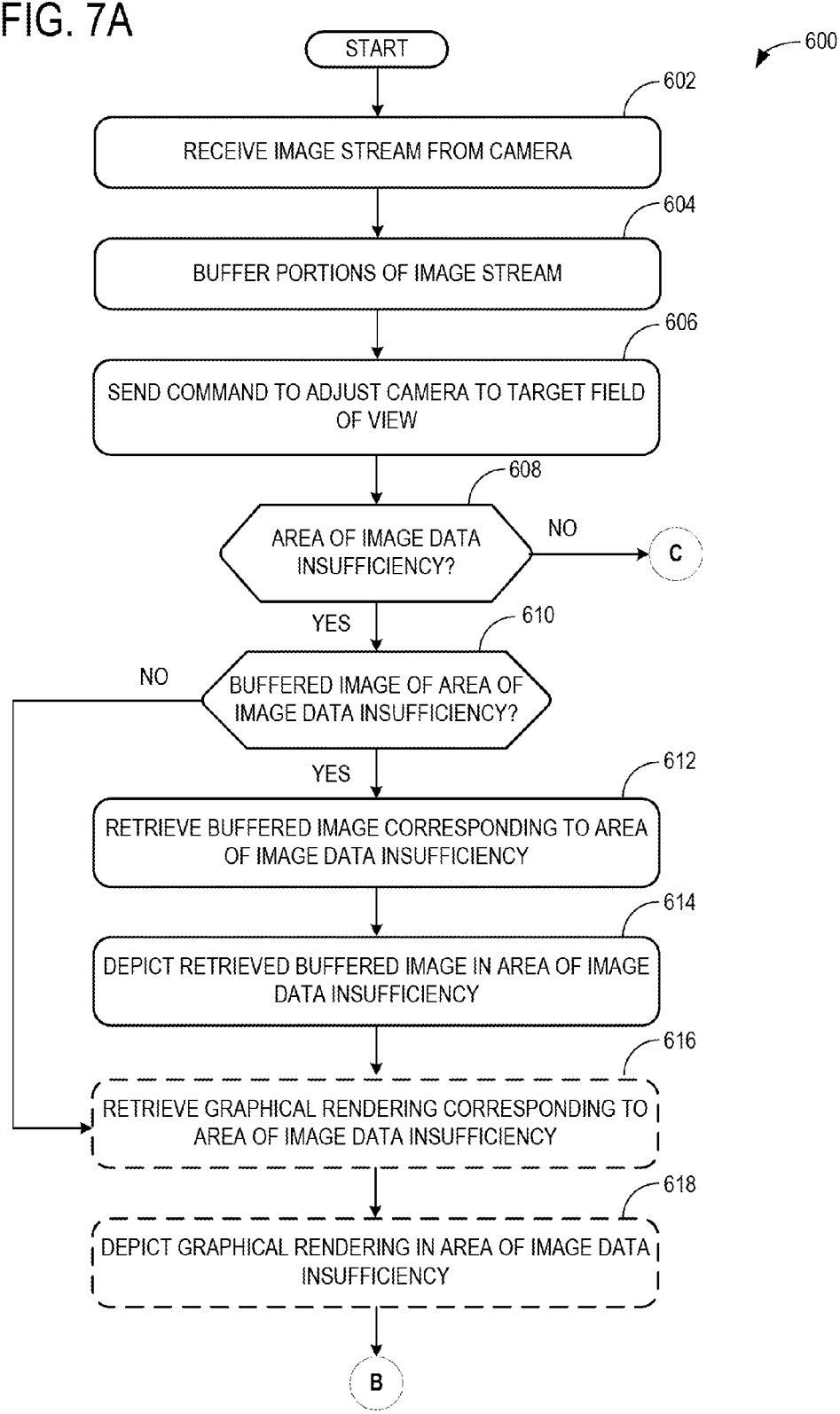

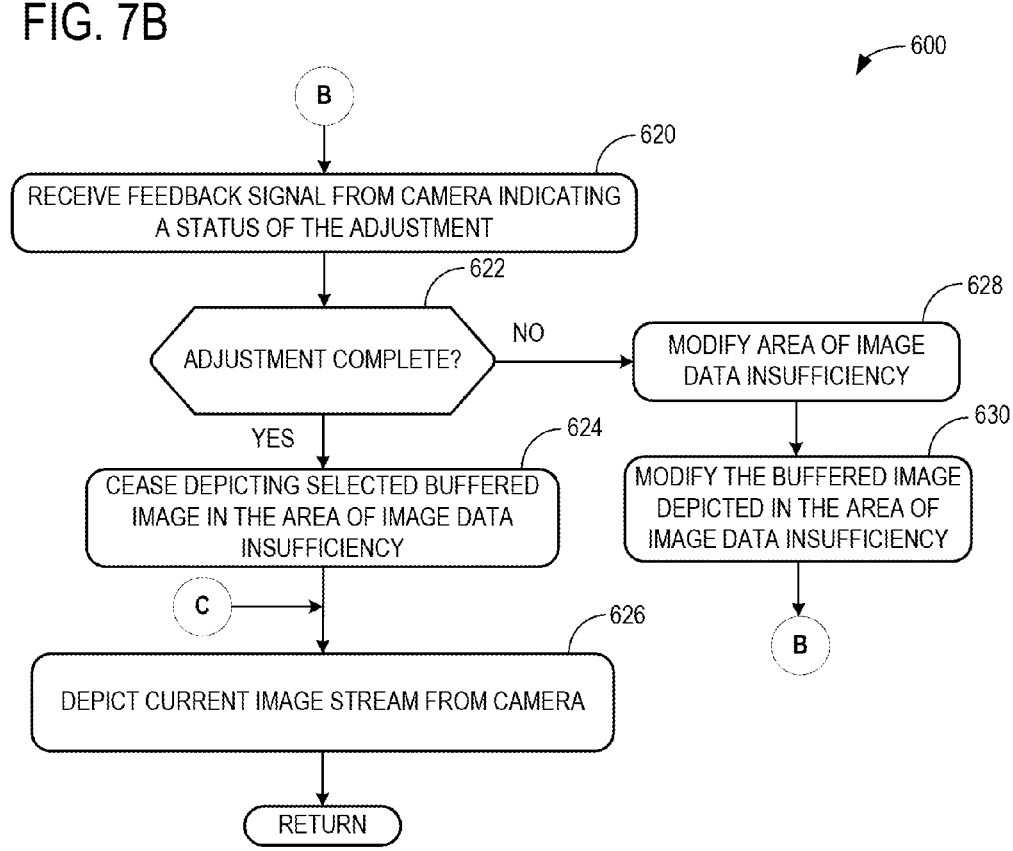

MARITIME CAMERA AND CONTROL SYSTEM

BACKGROUND

Navigation of maritime vessels requires accessing and processing numerous independent streams of data. The geographical position of the vessel, weather, wind speed and direction, tide and current speed, the relation of the position of the vessel to charted surface and subsurface features, measured depth of the water beneath the vessel, speed of the vessel, and the position, bearing, and speed of other vessels are just a few examples of the information that must be processed to allow an individual to safely navigate a maritime environment. This requires a vessel operator to use multiple instruments, charts, and visual information to obtain the necessary information describing the dynamic maritime environment.

One navigational aid is a camera system that can be panned and zoomed that provides the user with a real time video stream of a marine environment. However, pan and zoom operations typically require mechanical systems to be actuated, which can be slow to respond to commands. This can cause frustrating delay for the operator.

SUMMARY

A display device for controlling a remotely controlled camera is disclosed. According to one aspect, the display device comprises an image receiver configured to receive an image of the image stream from the camera, and a processor configured to process the image. The processor includes a retriever configured to retrieve a selected buffered image corresponding to a data insufficiency region within a target field of view while adjusting the camera from a current field of view to a target field of view until the image stream from the camera includes the insufficiency region being depicted within the target field of view and a depicter configured to depict the selected buffered image on the display device at least in the insufficiency region.

According to another aspect, a system for control of a remotely controlled marine camera is provided which includes a display device, a computing device, and a remotely controlled marine camera mounted to a superstructure element of a marine vessel configured to capture an image stream of a field of view. The remotely controlled camera may be adjustable to pan and optically zoom in or out at the command of the computing device. The computing device may be configured to receive the image stream and buffer portions of the image stream as buffered images in memory, each of the buffered images associated with a corresponding field of view of the camera. Further, each buffered image of the image stream may be integrated into a chart engine, the chart engine providing a 3-D virtual representation of the environment based upon a geo-positional location of the marine vessel and a field of view of the camera. The computing device may be further configured to send a command to adjust the camera from a current camera field of view to a target field of view, determine during the adjustment that a lag exists between an actual field of view of the camera and the target field of view which would result in a data insufficiency region within the target field of view for which there is no current image stream data from the camera to be displayed on the display device. Upon making such determination, the computing device may retrieve at least a portion of a selected buffered image and depict the portion of the selected buffered image on the display device at least in the insufficiency region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 7A and 7B schematically illustrate a method for control of a remotely controlled camera in a marine environment.

DETAILED DESCRIPTION

Figure 1:
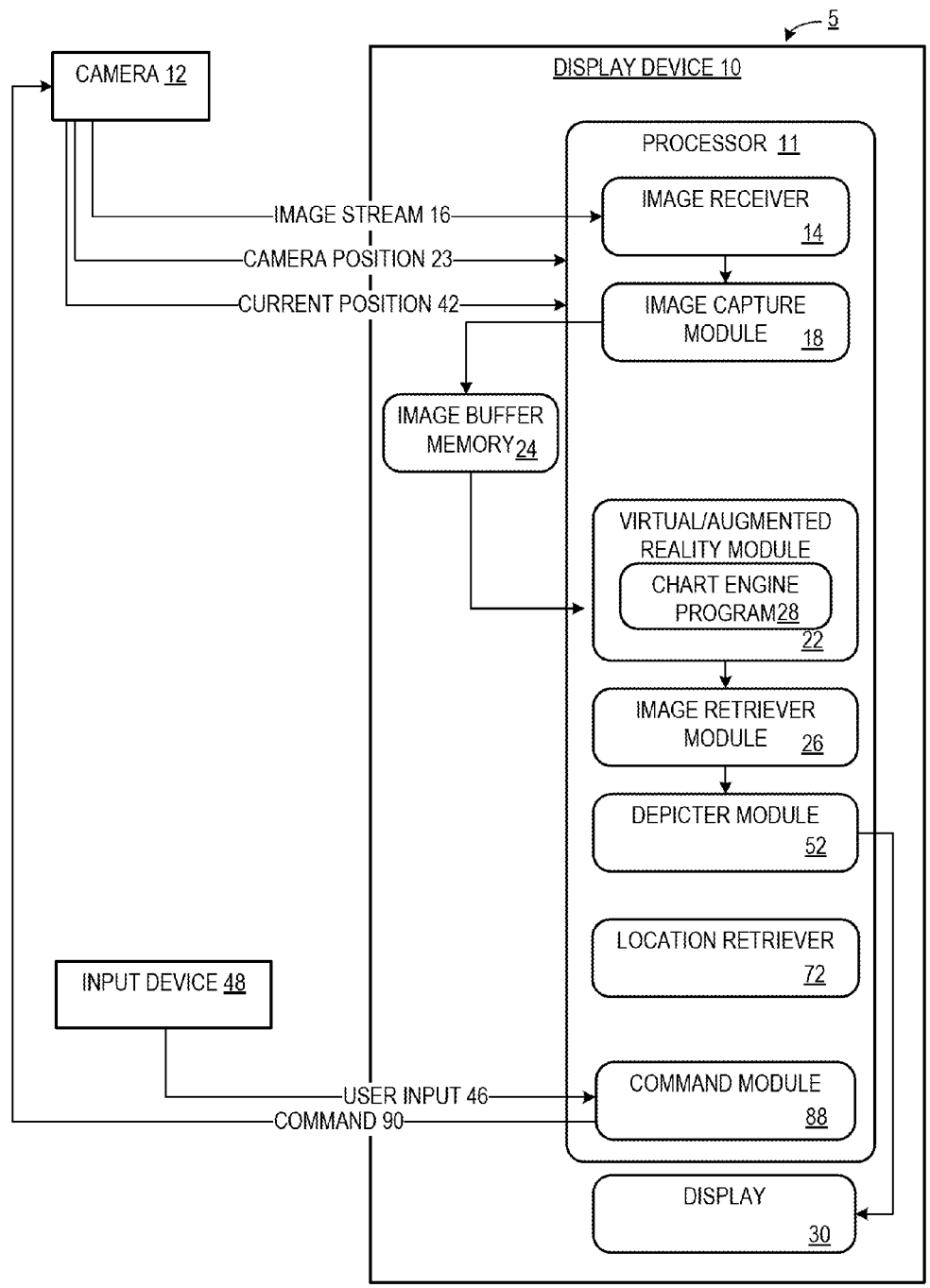
FIG. 1 is a simplified schematic view of a system for control of a remotely controlled camera.

Referring to FIG. 1, a system 5 for control of a remotely controlled camera is disclosed, which may be used in marine environments. As shown, system 5 includes a display device 10, camera 12, and an input device 48, which may be part of a navigation suite of a marine vessel. Display device 10 includes a processor 11 and other components such as volatile and nonvolatile memory and associated stored software configured to implement the features described below. Additional exemplary hardware details of a computing system that may be used as display device 10 are described with reference to FIG. 8.

Continuing with FIG. 1, camera 12 may be configured to transmit a stream of live images 16, camera position data 23, and current position data 42 to display device 10. In addition to displaying the live image stream to the vessel operator, display device 10 may is configured to implement panning and zooming with an at least partial preview image retrieved from buffered images, to address the drawbacks associated with conventional systems described above.

To achieve this functionality, a processor 11 is configured to execute an image receiver 14 configured to receive an image of the image stream 16 from camera 12, a capture module 18 configured to capture an image from the image stream and buffer it, an image retriever 26 configured to retrieve buffered images under certain conditions described below, a depicter module 52 configured to depict the retrieved images. A command sender or command module 88 is also provided, which is configured to receive pan and zoom commands from the user via a user input device. Each of these functions will now be described in detail.

Initially, image receiver 14 is configured to receive a series of individual images of the image stream 16 from camera 12. Capture module 18 may be configured to capture a plurality of images from image stream 16. Capture module 18 may be further configured to associate each captured image with a field of view and store the images as buffered images in image buffer memory 24. The image buffer memory 24 is typically memory located in an off-processor location, but may alternatively be located in an on-processor location in designs employing a system-on-chip processor in which both processing and memory logic are provided on the same chip. These buffered images form a library from which partial images from the camera may be augmented with buffered imagery in areas for which no live camera image is available, as described below.

Command module 88 may be configured to receive a user input 46 from user input device 48 and send a command 90 to pan the camera in a pan direction for adjusting camera 12 from a current field of view to a target field of view or adjust the optical zoom (zoom in/out) of camera 12 from a current field of view to a target field of view. User input device 48 may include one or more of a touchscreen, mouse, track ball or any other suitable means of input. It will be appreciated that as the camera is commanded to be panned or zoomed, a data insufficiency region may result, since the camera may require time to mechanically adjust its pan orientation or zoom setting, or in the case of digital zoom and pan, may require time to process a digital zoom or pan operation. If a user enters a command to pan to a target field of view, and a lag resulting from the mechanical adjustment or digital adjustment causes a delay in the adjustment of the camera, the system will not be able to display the target field of view immediately. As described by examples below, the region in the target field of view that cannot be displayed as the system adjusts the camera is referred to as a data insufficiency region.

When such a data insufficiency region results, a buffered image may be selected for retrieval based on a determination the buffered image and its associated field of view depicts the data insufficiency region in the target field of view of the camera. In this manner, previously buffered images from prior points in time may be used to compensate for the lack of data in the data insufficiency region. Although the buffered image may be out of date, it may provide an approximate view of the target field of view to the user, which has been found to be preferable than displaying nothing in the data insufficiency region.

Accordingly, image retriever 26 may be configured to retrieve a selected buffered image corresponding to the data insufficiency region within a target field of view while adjusting camera 12 from a current field of view to the target field of view. Depicter 52 may be configured to receive the retrieved image from the image retriever 26 and depict the selected buffered image on display 30 at least in the insufficiency region. It will be appreciated that depicter 52 may display only a part of the selected image relating to the area of insufficiency. The retrieved image may be displayed in the data insufficiency region until image stream 16 from camera 12 includes the insufficiency region within the target field of view as indicated by feedback from camera position signal 23 and current position signal 42 received by a feedback receiver of the processor. At this point, the live image is displayed to the user, rather than the buffered image which had been used as a proxy for the data insufficiency region.

Furthermore, processor 11 may include a virtual or augmented reality module 22 that may allow display device 10 to generate, store, and display a graphical rendering, virtual reality, and/or augmented reality representations of the marine environment including the target field of view. The virtual or augmented reality module of the display device may use geo-positional data of the vessel and camera, a chart engine program 28, and/or other suitable position information to generate the three-dimensional representation of the marine environment. Current position information may be retrieved by location retriever 72. To achieve an augmented reality representation of the marine environment, display device 10 may overlay the live image stream onto a virtual representation of the marine environment. Alternately, live image stream 16 may be integrated into chart engine program 28 to obtain an augmented reality representation of the marine environment.

It will be appreciated that the graphical renderings generated by the virtual or augmented reality module may be stored as buffered images. Thus, a graphical rendering of the marine environment may be generated, associated with a field of view of the camera, buffered, selected from a plurality of buffered graphical renderings based upon the determination that the graphical rendering of the marine environment depicts an insufficiency region within the target field of view, retrieved, and depicted on the display device within the insufficiency region as required.

Further, display device 10 may receive and process sensor data from a plurality of the vessel's sensors to provide additional information to the system operator. The vessel's sensors may include, but are not limited to geo-positional sensors, sensors indicating the marine vessel's attitude (i.e. the pitch and roll of the marine vessel), marine radar data, and sonar data.

Additionally, the computing device or computer may be further configured to receive zoom data from the remotely controlled camera, the zoom data indicating a current optical zoom setting. The computing device may receive an input indicating a command to adjust the current field of view at a first optical zoom setting to a target field of view having a second optical zoom setting. The computing device may then determine the center of the target field of view, retrieve a buffered image of the target field of view, and perform a digital zoom operation upon the buffered image to generate a digitally enhanced image of the selected area at the second optical zoom setting. Furthermore, the computing device may determine a difference between an area of the target field of view and the maximum area of a field of view of the camera and, if necessary, render a three-dimensional virtual representation of any area of the target area that exceeds the maximum area of the field of view of the camera. The computing device may depict the digitally enhanced image of the selected area including the three-dimensional virtual representation of at least the area of the target area exceeding the maximum area of the field of view of the camera, send a command to the remotely controlled camera to adjust the zoom of the remotely controlled camera and a concurrent command to a motor system of the remotely controlled to position the remotely controlled camera such that the center of a field of view of the camera is aligned to the determined center of the target field of view. Upon completion of the adjustment of the zoom setting, the computing device may display a live image stream of the target field of view including the three-dimensional virtual representation of at least the area of the target area exceeding the maximum area of the field of view of the camera.

Figure 2:
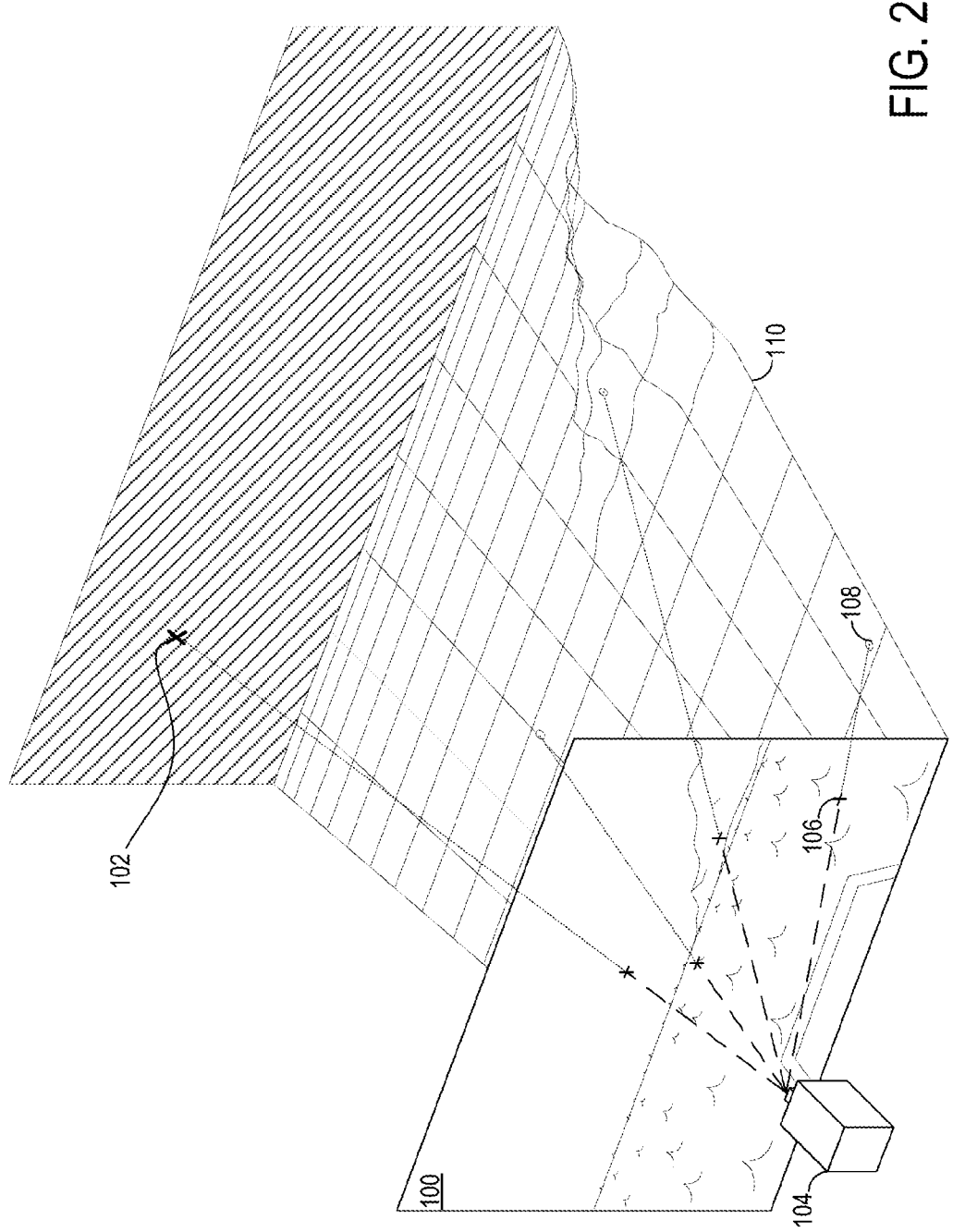
FIG. 2 is an illustrative example of an image being projected onto a virtual marine environment.

FIG. 2 is an illustrative example of an image being projected onto the virtual marine environment. A virtual camera 104 may be positioned at a projection point corresponding to the camera position of camera 12 described above and having a virtual field of view corresponding to the field of view of the camera 12. Various lines of sight within the virtual field of view of the virtual camera 104 are indicated in FIG. 2 by dashed lines until intersecting the image 100, and then by dotted lines until intersecting the virtual marine environment 110. For example, one line of sight of virtual camera 104 intersects the image 100 at a point 106 and with the virtual marine environment 110 at a point 108 such that point 106 may correspond to point 108. Point 106 may be one of a plurality of points of the image 100, indicated by plus signs. Point 108 may be one of a plurality of points of the virtual marine environment 110, indicated by circles.

A point 102, represented by an X, may correspond to a point on the image in the sky. Because the sky is infinitely far away from the camera 104, point 102 may not be able to be projected upon in this manner. The sky, represented by a hashed plane, may not exist in the virtual marine environment 110. When the projected image is generated, the sky may be represented as in the image 100, but the location information of points therein may not be obtainable.

Figure 3B:
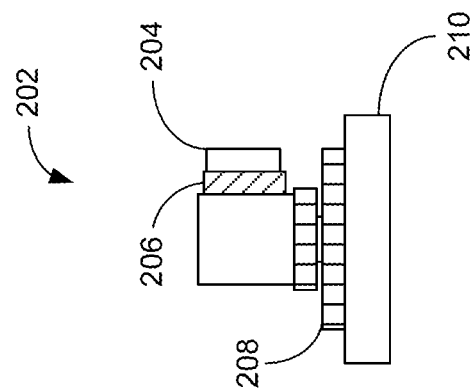
FIGS. 3A and 3B are illustrative examples of a camera on board a marine vessel.
Figure 3A:
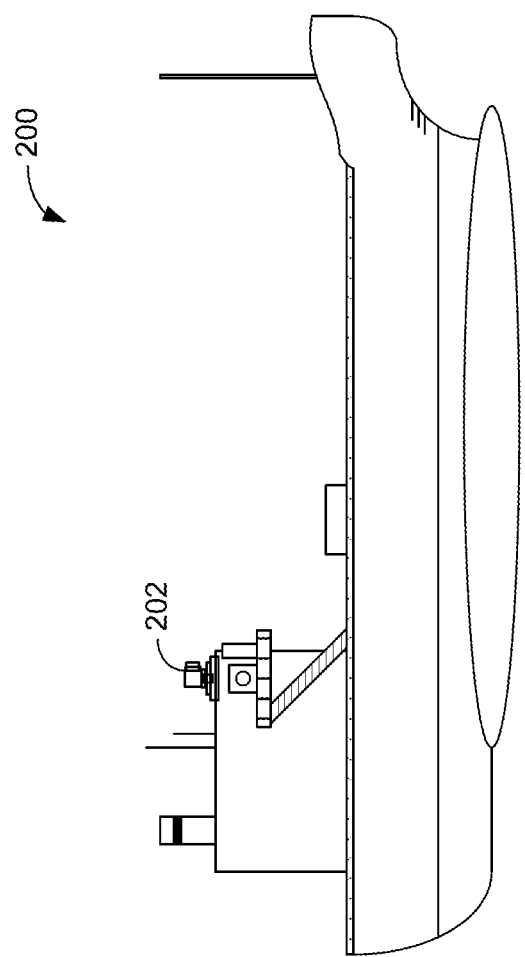

FIG. 3A illustrates a marine vessel 200 with a remotely controlled camera marine 202 mounted to the superstructure. It will be appreciated that marine camera 202 may be operationally analogous to camera 12 of FIG. 1. Marine camera 202 includes a lens 204, adjustable zoom 206, mounting assembly 210, and motor assembly 208 as illustrated in FIG. 3B. As discussed above, the display/device computing device includes a controller/command module allowing the display device to send commands to marine camera 202. For example, a command to pan marine camera 202 will result in actuation of motor assembly 208 to rotate marine camera 202 in the requested panning direction. Furthermore, the display device may send commands to adjust adjustable zoom 206 of marine camera 202. It will be appreciated that marine camera 202 will provide feedback data via a sensor network of the arc position of marine camera 202, the current setting of adjustable zoom 206, and data indicating the operational status of each element of marine camera 202. It will also be appreciated that mounting assembly 210 of marine camera 202 may include motion dampening assemblies to account for pitch and roll.

Figure 4:
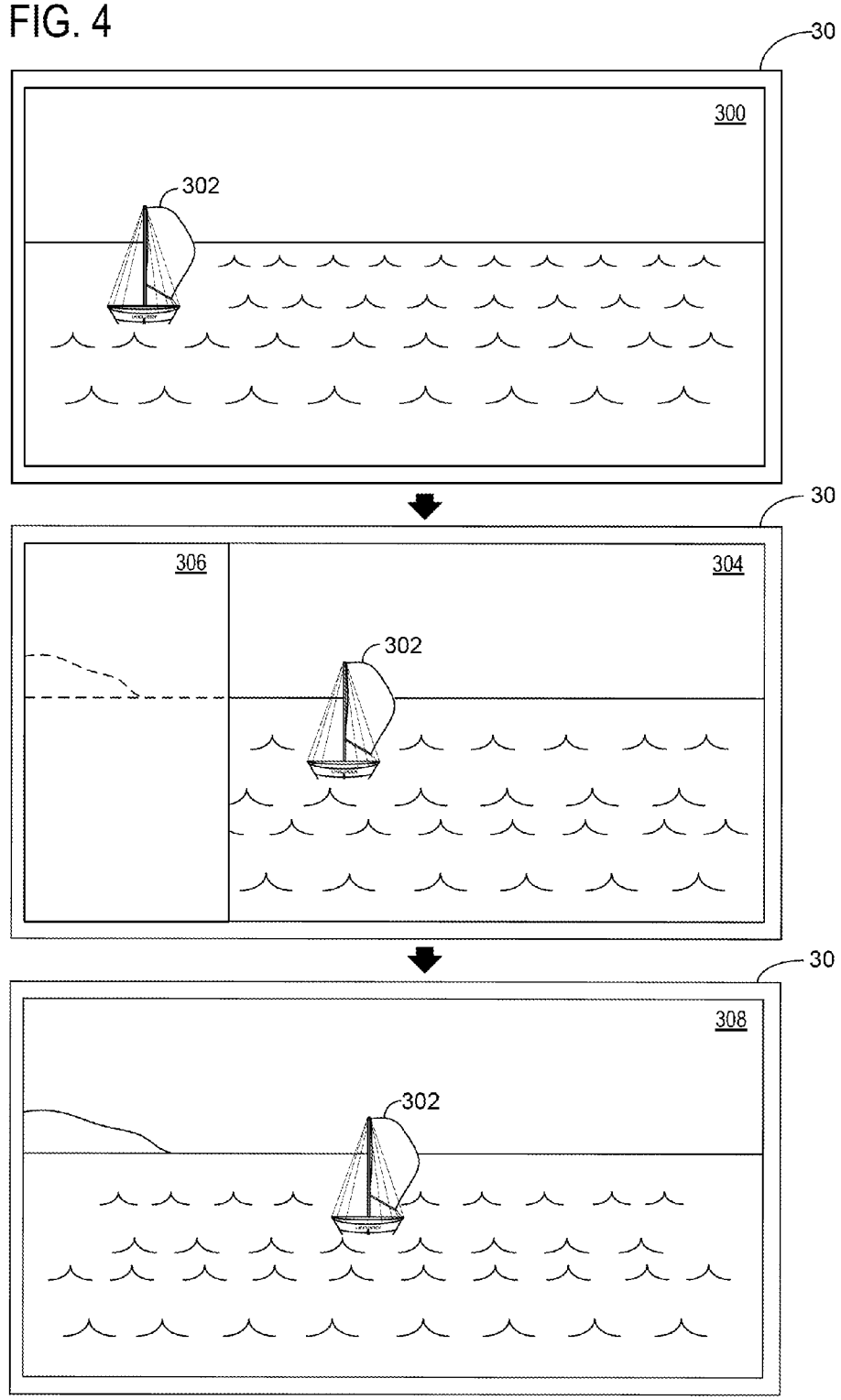
FIG. 4 is an illustrative example of the display device performing a panning operation of the camera.

FIG. 4 illustrates a non-limiting example wherein the vessel operator may input a command to pan the remotely controlled camera to a target field of view. Prior to the command to pan the camera, display device 30 is displaying a live image stream 300 including vessel 302 as shown. Upon receipt of the command, the display device may buffer the last image from the image stream of the current field of view and store the buffered image data to memory. The display device may send a command to the motor assembly to rotate the camera to the target field of view. In some instances, the entire target field of view may not be included in the current field of view. This may result in a region of image data insufficiency 306 due to a lag between the actual field of view and the target field of view. Thus, the display device may determine the presence of such a lag and retrieve buffered image data to fill the resultant area of image data insufficiency 306 located on a side of the display device corresponding to the pan direction. The display device may then display the retrieved image data (shown in dashed line) in at least the region of image data insufficiency 306.

Alternately, the display device may retrieve or generate a three-dimensional virtual representation of the region of image data insufficiency 306. The three-dimensional virtual representation may be displayed in the region of insufficiency or incorporated into the retrieved image data in an augmented reality presentation. It is important to note that the camera may continue to provide a live image stream as the motor assembly pans the camera toward the target field of view. Feedback sensors may provide the position data indicating that the target field of view has been achieved and the display device may then cease displaying the retrieved and/or virtual image data and display a live image stream of the target field of view 308.

In the case where a target field of view is not within the current field of view, upon receiving the command to pan the camera, the computer may retrieve and display buffered image data including the target field of view. The operator may then confirm the target field of view prior to the display device sending the command to pan the camera.

Figure 5:
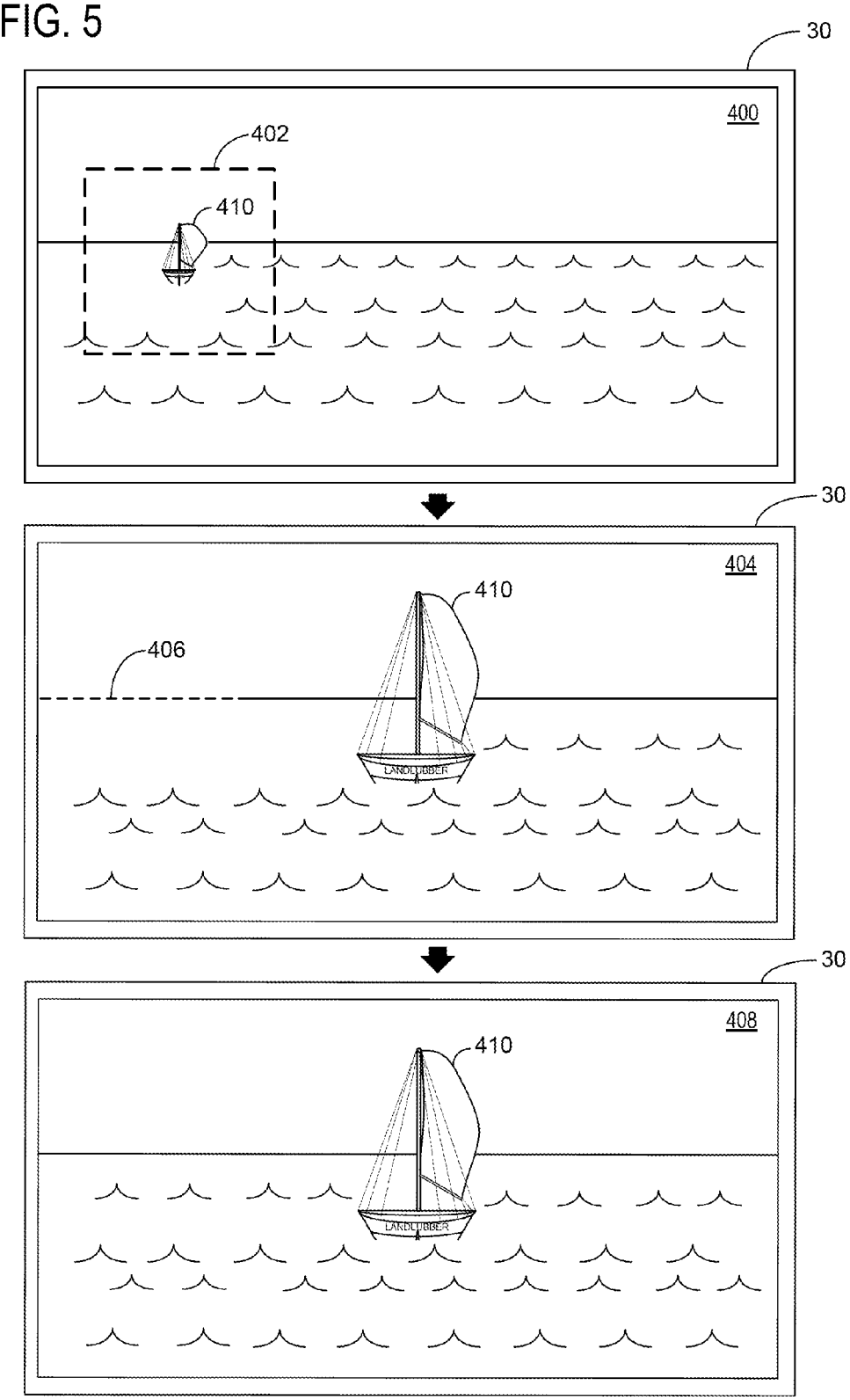
FIG. 5 is an illustrative example of the display device performing a zoom in operation.

As another example, a command may be provided to change the zoom of the camera. Prior to receiving the command display device 30 is displaying a live image stream of the marine environment 400 including vessel 410 as shown in FIG. 5. The operator may designate a target field of view 402 as shown. Upon designation of target field of view 402, the display device may perform a digital zoom operation to generate a digitally enhanced image 404 of the target of the target field of view. The display device may use any suitable digital enhancement method including a numerical expansion method, for example. The display device may then send a command to camera to adjust the optical zoom of the camera. The camera may then adjust the optical zoom and send feedback to the display device indicating the optical zoom setting. Upon receipt of a feedback signal indicating completion of the adjustment of the optical zoom setting, the display device may display a live image stream 408 at the desired optical zoom.

Additionally, the display device may determine a center of the target field of view and send a command to the camera and motor assembly to pan the camera such that the center of the field of view of the camera is aligned to the determined center of the target field of view. As discussed above with reference to FIG. 4, a buffered or virtual image may be displayed in any area of image data insufficiency 406 due to the panning and adjustment of the zoom of the camera.

Figure 6:
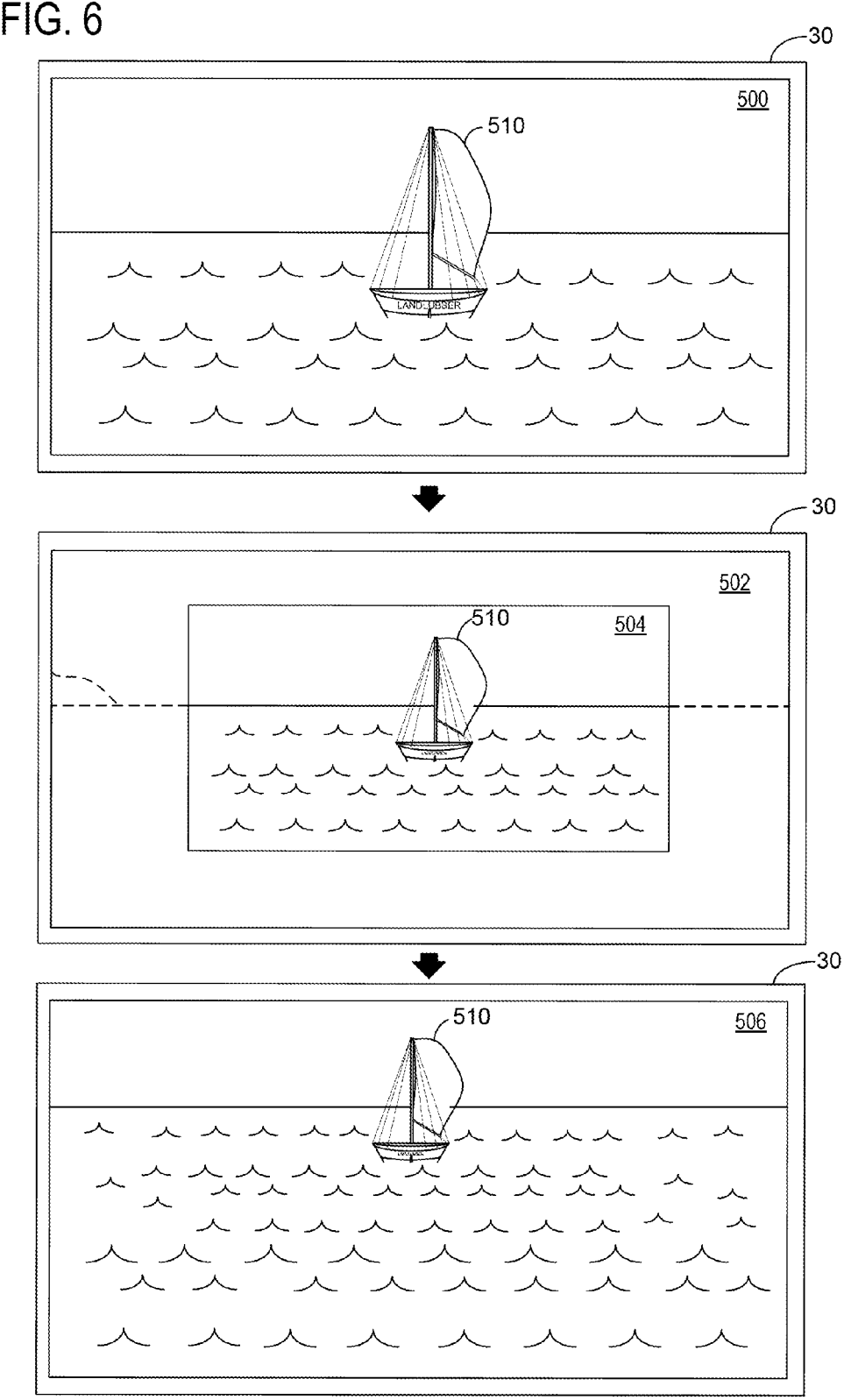
FIG. 6 is an illustrative example of the display device performing a zoom out operation.

Alternately, the vessel operator may provide input to the display device to decrease the optical zoom of the camera. FIG. 6 illustrates a live stream of a current field of view 500 including vessel 510 on display device 30. The display device may perform a digital zoom operation upon a last image of the current image stream and display the digitally enhanced image 504. The computer system may then send a command to camera to adjust the optical zoom of the camera. The camera may then adjust the optical zoom and send feedback to the display device of the optical zoom setting. The display device may then display a live image stream at the desired optical zoom 506.

In the event that the requested decrease in zoom exceeds the maximum field of view of the camera, an area of image data insufficiency 502 surrounding the zoomed image may result. In this case, the display device may retrieve and display a buffered image representing the area of image data insufficiency. Alternately, the computing device may display a virtual representation of objects within the area of image data insufficiency.

It will be appreciated that the computing device or display device may generate and display a zoom animation from retrieved buffered images associated with the target area of the zoom and the nature of the requested zoom operation.

FIGS. 7A and 7B schematically illustrate a method for control of a remotely controlled camera in a marine environment. At 602, method 600 includes receiving an image stream from the remotely controlled camera. As discussed above, images from the image stream may be captured by the capture module of the processor.

At 604, method 600 includes buffering portions of the image stream/captured images to a storage device. It will be appreciated that each buffered image will be encoded with information associating the buffered image with a specific field of view of the camera.

At 606, method 600 includes sending a command to adjust the camera from a current field of view to a target field of view. Example commands may include panning the camera, adjusting the optical zoom of the camera, or a combination of both pan and zoom. The command may be sent from the command module of the display device/ computing device to the camera in response to input from an operator requesting the change in field of view of the camera.

At 608, method 600 includes determining if an area of image data insufficiency due to a lack current image stream data from the camera to be displayed on the display device. The area of insufficiency of image data from the camera may result due to a lag between the display and the camera during the adjustment of the field of view, panning or a large adjustment of the optical zoom setting, for example. For a pan operation an area of insufficiency may be positioned on a side of the display device corresponding to the direction of the pan. For an optical zoom adjustment, the area of insufficiency may at least partially surround the origin field of view of the camera as displayed on the display device at the time of the command. If no area of insufficiency of image data is determined the target field of view may be displayed from the live image stream of the camera at 626. If an area of insufficiency is determined to exist method 600 may proceed to 610.

At 610, method 600 includes determining if the area of insufficiency is depicted in a buffered image. It will be appreciated that images stored in the image buffer may be selected on the basis of association with the area of insufficiency within the target field of view, age of the buffered image, and/or any other suitable criteria. If a suitable buffered image does not exist in the image buffer, method 600 may proceed to 616.

If a buffered image associated with the area of insufficiency is stored, method 600 may proceed to 612 which includes selecting and retrieving the buffered image using the retriever module.

At 614, method 600 includes the depicter module depicting the buffered image in at least the area of insufficiency on the display. It will be appreciated that the depicter module may also depict an animation associated with the requested change in field of view. For example, for a zoom-in or zoom-out operation, a digital zoom animation that respectively expands or contracts the selected buffered image is displayed, the digital zoom animation being generated based upon the selected buffered image and/or other of the plurality of buffered images.

At 616, method 600 includes retrieving a graphical rendering of the area of image data insufficiency. It will be appreciated that this may occur due to the lack of a buffered image associated with the area of image data insufficiency requiring that a plurality graphical renderings of the marine environment including a graphical rendering of the target field of view be generated, associated with a field of view of the camera, buffered in memory. Alternately, the plurality of graphical renderings of the marine environment may be incorporated with a selected buffered image to render an augmented reality depiction of the area of image data insufficiency.

At 618, method 600 includes depicting the graphical rendering in at least the area of image data insufficiency. It will once again be appreciated that the graphical rendering may be integrated with the buffered image to offer an augmented reality depiction of target field of view.

At 620, method 600 includes receiving one or more feedback signals indicating a current status of the adjustment of the field of view of the camera to the target field of view. For example, the feedback signal may include one or more of an arc position, azimuth, elevation, optical zoom setting, and/or any other sensor data relating the field of view of the camera relative to the marine environment and target field of view in three-dimensional space. It will be appreciated that the feedback signal from the camera may be a continuous stream of data and may indicate a transition to the target field of view and/or a completion of the adjustment to the target field of view.

At 622, method 600 includes determining if the feedback signal indicates a completion of the adjustment of the camera to the target field of view. If the adjustment is not complete, method 600 may proceed to 628. If the adjustment is complete and the current image stream from the camera includes the area of image data insufficiency, method 600 may proceed to 624.

At 628, method 600 includes modifying the area of image data insufficiency. For example, as the camera adjusts the field of view, proper display of the marine environment may require the area of image data insufficiency to translate horizontally and/or vertically depending on the direction of pan of the camera. Another example may require the size of the area of image data insufficiency to change with the adjustment of the field of view of camera.

At 630, method 600 includes modifying the depicted buffered image on the display device according to the modifications to the area of image data insufficiency of 628. It will be appreciated that the modifications to both the area of image data insufficiency and the selected buffered image within may occur continuously to present a smooth display of the transition to the target field of view. It will be further appreciated that the computing device/display device may select, retrieve, and depict additional buffered images that more accurately depict the modified area of image data insufficiency.

At 624, method 600 includes ceasing depiction of the selected buffered image in the area of image data insufficiency.

At 626, method 600 includes depicting the current image stream of the target field of view from the camera.

In some embodiments, the methods and processes described herein may be tied to a computing device of one or more computing devices. In particular, such methods and processes may be implemented as a computer-application program or service, an application-programming interface (API), a library, and/or other computer-program product.

Figure 8:
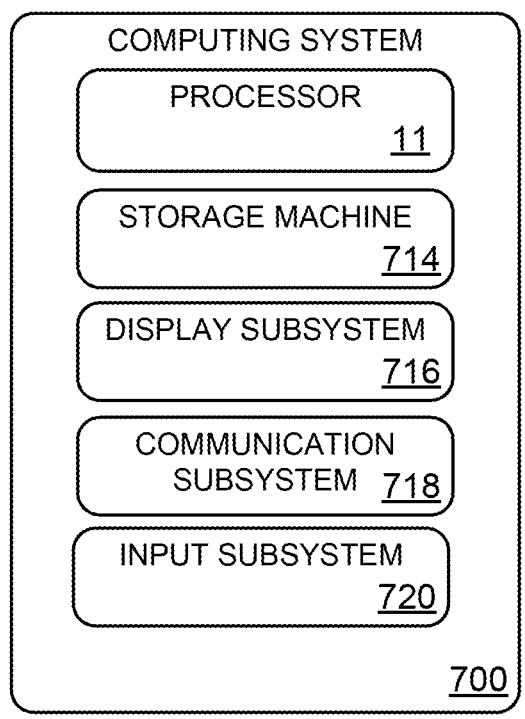
FIG. 8 is an illustrative example of an example computing system.

FIG. 8 schematically shows a non-limiting embodiment of a computing system 700 that can enact one or more of the methods and processes described above. Computing system 700 is shown in simplified form. Computing system 700 may take the form of one or more personal computers, server computers, tablet computers, network computing devices, mobile computing devices, mobile communication devices, and/or other computing devices.

Computing system 700 includes a processor 11 and a storage machine 714. Computing system 700 may optionally include a display subsystem 716, input subsystem 720, communication subsystem 718, and/or other components not shown in FIG. 7.

Processor 11 includes one or more physical devices configured to execute instructions. For example, the processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The processor may include one or more processors configured to execute software instructions. Additionally or alternatively, the processor may include one or more hardware or firmware processors configured to execute hardware or firmware instructions. Processors of the processor may be single-core or multi-core, and the instructions executed thereon may be configured for sequential, parallel, and/or distributed processing. Individual components of the processor optionally may be distributed among two or more separate devices, which may be remotely located and/or configured for coordinated processing. Aspects of the processor may be virtualized and executed by remotely accessible, networked computing devices configured in a cloud-computing configuration.

The processor may also include one or more modules that provide specific functionalities as describe in FIG. 1.

Storage machine 714 includes one or more physical devices configured to hold instructions executable by the processor to implement the methods and processes described herein. When such methods and processes are implemented, the state of storage machine 714 may be transformed—e.g., to hold different data.

Storage machine 714 may include removable and/or built-in devices. Storage machine 714 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 714 may include volatile, nonvolatile, dynamic, static, read/write, read-only, random-access, sequential-access, location-addressable, file-addressable, and/or content-addressable devices.

It will be appreciated that storage machine 714 includes one or more physical devices. However, aspects of the instructions described herein alternatively may be propagated by a communication medium (e.g., an electromagnetic signal, an optical signal, etc.) that is not held by a physical device for a finite duration.

Aspects of processor 11 and storage machine 714 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via processor 11 executing instructions held by storage machine 714. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 716 may be used to present a visual representation of data held by storage machine 714. This visual representation may take the form of a graphical user interface (GUI). As the herein described methods and processes change the data held by the storage machine, and thus transform the state of the storage machine, the state of display subsystem 716 may likewise be transformed to visually represent changes in the underlying data. Display subsystem 716 may include one or more display devices utilizing virtually any type of technology. Such display devices may be combined with processor 11 and/or storage machine 714 in a shared enclosure, or such display devices may be peripheral display devices.

When included, input subsystem 720 may comprise or interface with one or more user-input devices such as a keyboard, mouse, or touch screen. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. Additionally, input subsystem 720 may relay commands to the command module 712 for control of the remote marine camera When included, communication subsystem 718 may be configured to communicatively couple computing system 700 with one or more other computing devices, sensors, and/or a marine camera. Communication subsystem 718 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A display device for controlling a remotely controlled camera, the display device comprising:
   an image buffer memory; and
   a processor including:
      an image receiver configured to receive an image of an image stream from the camera;
      a chart engine configured to integrate the image stream into a 3-D virtual representation of a marine environment based upon a geo-positional location of the camera and a field of view of the camera;

a capture module configured to buffer portions of the image stream as buffered images in the image buffer memory, each of the buffered images being associated with a corresponding field of view of the camera;

a command sender configured to adjust the camera from a current field of view to a target field of view;

a retriever configured to retrieve at least a portion of a selected buffered image, upon determining during the adjustment that a lag exists between an actual field of view of the camera and the target field of view which would result in a data insufficiency region within the target field of view for which there is no current image stream data from the camera to be displayed on the display device; and a depicter module configured to depict the selected buffered image on a display of the display device at least in the data insufficiency region.

2. The display device of claim 1, wherein
the capture module is configured to capture a plurality of images from the image stream and store the images as buffered images in memory; and
the selected buffered image is selected from the plurality of buffered images based on a determination that the selected buffered image depicts the data insufficiency region in the target field of view of the camera.

3. The display device of claim 1, wherein
the processor further includes:
a virtual reality module configured to generate a graphical rendering of the marine environment, including the target field of view; and
the selected buffered image is selected from the plurality of buffered images based on a determination that the selected buffered image depicts the data insufficiency region in the target field of view of the camera.

4. The display device of claim 3, wherein
the virtual reality module is configured to overlay a prior image from the image stream depicting the data insufficiency region in the target view on the selected buffered image including the graphical rendering of the target field of view, to thereby produce an augmented reality representation of the data insufficiency region.

5. The display device of claim 1, wherein
the command sender is configured to send a command to pan the camera in a pan direction for adjusting the camera from the current field of view to the target field of view; and
the data insufficiency region is positioned on a side of the display device corresponding to a direction of the pan.

6. The display device of claim 1, wherein
the command sender is configured to send a command to zoom out the field of view of the camera for adjusting the camera from the current field of view to the target field of view; and
the data insufficiency region at least partially surrounds origin field of view on the display device at a time of the command.

7. The display device of claim 1, wherein
the command sender is configured to send a command to zoom-in or zoom-out the field of view of the camera for adjusting the camera from the current field of view to the target field of view, and wherein during the zoom-in or zoom-out operation a digital zoom animation that respectively expands or contracts the selected buffered image is displayed, the digital zoom animation being generated based upon the selected buffered image and/or other of the plurality of buffered images.

8. The display device of claim 1, wherein
the processor further includes a feedback receiver configured to receive a feedback signal from the camera indicating a current status of the adjustment; and
in response to receiving the feedback signal, the processor is configured to modify the data insufficiency region based upon the current status of the adjustment, and to modify the portion of the selected buffered image that is displayed in the data insufficiency region.

9. The display device of claim 1, wherein
the processor further includes a feedback receiver configured to receive a feedback signal from the camera indicating that it has completed the adjustment to the target field of view; and
in response to receiving the feedback signal, the processor is configured to cease displaying the selected buffered image, and display the current image stream from the camera.

10. A method for control of a remotely controlled camera in a marine environment, the method comprising:
receiving an image stream from the camera;
integrating the image stream into a chart engine, the chart engine providing a 3-D virtual representation of the marine environment based upon a geo-positional location of the camera and a field of view of the camera;
buffering portions of the image stream as buffered images in memory, each of the buffered images being associated with a corresponding field of view of the camera;
sending a command to adjust the camera from a current camera field of view to a target field of view;
determining during the adjustment that a lag exists between an actual field of view of the camera and the target field of view which would result in a data insufficiency region within the target field of view for which there is no current image stream data from the camera to be displayed on the display device;
upon determining that a lag exists, retrieving at least a portion of a selected buffered image; and
depicting the portion of the selected buffered image on the display device at least in the insufficiency region.

11. The method of claim 10, wherein
generating a graphical rendering of the marine environment, including the target field of view;
buffering a plurality of graphical renderings in memory as the buffered images, each of the buffered images; and
selecting the selected buffered image from the plurality of buffered images based on a determination that the selected buffered image depicts the insufficiency region in the target field of view of the camera.

12. The method of claim 11, further comprising: overlaying a prior image depicting the insufficiency region in the target view on the selected buffered image including the graphical rendering of the target field of view, to thereby produce an augmented reality representation of the insufficiency region.

13. The method of claim 11, wherein the command is to pan the camera in a pan direction, and the insufficiency region is positioned on a side of the display device corresponding to a direction of the pan.

14. The method of claim 11, wherein the command is to zoom out the field of view of the camera, and the region of insufficiency at least partially surrounds origin field of view on the display device at a time of the command.

15. The method of claim 11, wherein the command is to zoom-in or zoom-out the field of view of the camera, and wherein during the zoom-in or zoom-out operation a digital zoom animation that respectively expands or contracts the selected buffered image is displayed, the digital zoom animation being generated based upon the selected buffered image and/or other of the plurality of buffered images.

16. The method of claim 11, further comprising:
receiving a feedback signal from the camera indicating a current status of the adjustment; and
in response to receiving the feedback signal:
modifying the insufficiency region based upon the current status of the adjustment; and
modifying the portion of the selected buffered image that is depicted in the insufficiency region.

17. The method of claim 11, wherein
receiving a feedback signal from the camera indicating that it has completed adjustment to the target field of view; and
in response to receiving the feedback signal and determining the image stream includes the region of insufficiency:
ceasing depiction of the selected buffered image; and
depicting the current image stream from the camera.

18. A system for control of a remotely controlled marine camera, the system comprising:
a display device;
a remotely controlled marine camera mounted to a superstructure element of a marine vessel configured to capture an image stream of a field of view and being adjustable to pan and optically zoom in or out;
a computing device configured to:
receive the image stream and buffer portions of the image stream as buffered images in memory, each of the buffered images being associated with a corresponding field of view of the camera;
integrate the image stream into a chart engine, the chart engine providing a 3-D virtual representation of the environment based upon a geo-positional location of the marine vessel and a field of view of the camera;
send a command to adjust the camera from a current camera field of view to a target field of view;
determine during the adjustment that a lag exists between an actual field of view of the camera and the target field of view which would result in a data insufficiency region within the target field of view for which there is no current image stream data from the camera to be displayed on the display device; and
upon making such determination:
retrieve at least a portion of a selected buffered image; and
depict the portion of the selected buffered image on the display device at least in the insufficiency region.

19. The system of claim 18, wherein the computer is further configured to:
receive zoom data from the remotely controlled camera, the zoom data indicating a current optical zoom setting;
receive an input indicating a command to adjust the current field of view at a first optical zoom setting to the target field of view, the target field of view having a second optical zoom setting;
determine the center of the target field of view;
retrieve a buffered image of the target field of view;
perform a digital zoom operation upon the buffered image to generate a digitally enhanced image of the selected area at the second optical zoom setting;
determine a difference between an area of the target field of view and the maximum area of a field of view of the camera;
render a three-dimensional virtual representation of any area of the target area that exceeds the maximum area of the field of view of the camera;
depict the digitally enhanced image of the selected area including the three-dimensional virtual representation of at least the area of the target area exceeding the maximum area of the field of view of the camera;
send a command to the remotely controlled camera to adjust the zoom of the remotely controlled camera;
send a concurrent command to a motor system of the remotely controlled camera to position the remotely controlled camera such that the center of a field of view of the camera is aligned to the determined center of the target field of view; and
display a live image stream of the target field of view including the three-dimensional virtual representation of at least the area of the target area exceeding the maximum area of the field of view of the camera.

* * * * *